I. De HAVEN.
BROILER.

No. 171,924. Patented Jan. 11, 1876.

Witnesses:
R. C. Wrensdall
L. C. Fitler.

Inventor:
Isaac DeHaven
Bakewell & Kerr
Attorneys.

UNITED STATES PATENT OFFICE.

ISAAC DE HAVEN, OF PITTSBURG, PENNSYLVANIA.

IMPROVEMENT IN BROILERS.

Specification forming part of Letters Patent No. 171,924, dated January 11, 1876; application filed September 4, 1875.

*To all whom it may concern:*

Be it known that I, ISAAC DE HAVEN, of Pittsburg, in the county of Allegheny and State of Pennsylvania, have invented a new and useful Improvement in Broilers; and I do hereby declare the following to be a full, clear, and exact description thereof, reference being had to the accompanying drawing forming a part of this specification, in which—

Figure 1:
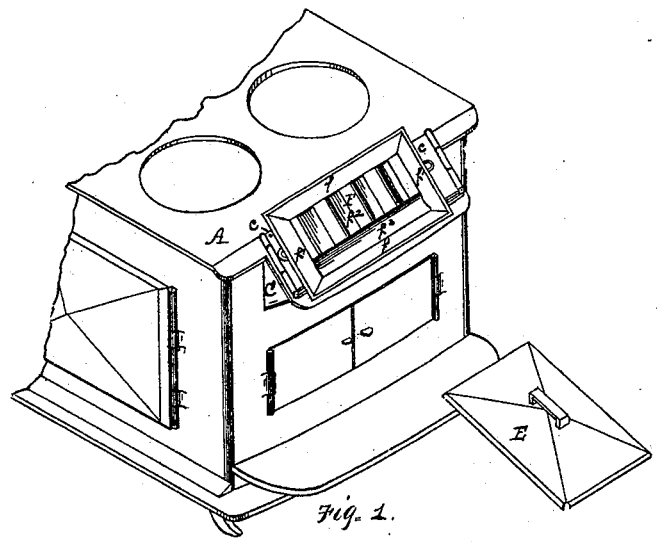
Figure 2:
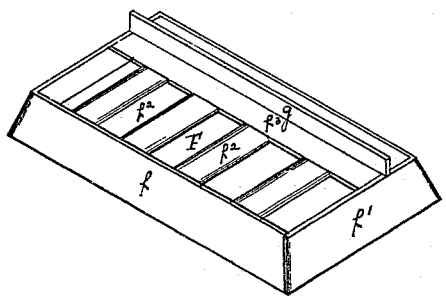
Figure 3:
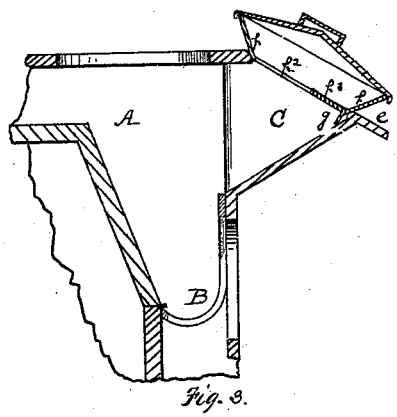

Figure 1 is a perspective view of a cooking-stove and broiler. Fig. 2 is a bottom view of the broiler, and Fig. 3 is a section of stove and broiler.

Like letters refer to like parts wherever they occur.

My invention relates to broilers for cooking-stoves, &c.; and it consists in forming the broiler with pan-sides, and a flange or projection upon its under surface, for sustaining it in position, and adapting it for use with an enlarged inclined feed-opening or similar opening of the stove, whereby a neat, compact, and convenient device for broiling meats, &c., is obtained.

The common manner of using broilers is either in an inclined position before the grate, or by removing the covers of the stove and allowing the broilers to rest in a horizontal position over the openings; and broilers are, in general, flat castings having shallow gutters or depressions to drain off the meat-juices; hence the broiling of meats is commonly attended with loss of meat-juices and soiling of the stove, due to the flying of the heated fat.

The object of the present invention is to overcome the objections and annoyances specified.

In the drawing, A indicates a stove provided with the usual grate B, and having an enlarged feed, C, the opening of which exceeds considerably the size of the usual feed-opening, and is closed, preferably, by folding doors $c\,c$. The outer or face plate $e$ of the feed is placed at an angle, so as to receive the reflected heat from the rear wall of the fire-chamber. F is a broiler, formed with raised or pan-like sides and ends $f\,f\,f^1\,f^1$ and the guttered bottom bars $f^2\,f^2$, the latter terminating in the usual longitudinal drip-gutter $f^3$. Upon the under side or bottom of this pan-broiler F is a flange or projection, $g$, which serves to retain the broiler in position when used upon the inclined feed-opening; but it is evident other devices may be employed for that purpose. E is a cover, usually employed with the pan-broiler, to prevent the escape of smoke, &c., from the burning fats.

The advantages of combining the broiler with the inclined feed-opening are, that while the meat or other article is subjected to reflected heat, and thus effectively acted upon, it is, at the same time, removed from the line of draft, so as to be protected from the products of combustion, and yet is so located that any smoke formed in the closed broiler must, of necessity, pass down into the stove, and pass off thence with the products of combustion.

Having thus described my invention, what I claim, and desire to secure by Letters Patent, is—

The covered broiler F, having the raised sides and ends $f\,f^1$, a suitable drip-gutter, $f^3$, and a projection or flange, $g$, the whole adapted for use with the inclined feed-opening of a cook-stove, substantially as specified.

In testimony whereof I, the said ISAAC DE HAVEN, have hereunto set my hand.

ISAAC DE HAVEN.

Witnesses:
W. N. PAXTON,
JAMES I. KAY.